VARIABLE FEEDBACK NOTCH FILTER

Filed July 24, 1964 2 Sheets-Sheet 1

BENJAMIN F. HOFFMAN
ROBERT L. KONIGSBERG
INVENTORS

BY Claude Funkhouser
ATTORNEY

VARIABLE FEEDBACK NOTCH FILTER

Filed July 24, 1964 2 Sheets-Sheet 2

BENJAMIN F. HOFFMAN
ROBERT L. KONIGSBERG
INVENTORS

BY
Claude Funkhouser
ATTORNEY

United States Patent Office 3,369,189

Patented Feb. 13, 1968

3,369,189

VARIABLE FEEDBACK NOTCH FILTER

Benjamin F. Hoffman, Hyattsville, and Robert L. Konigsberg, Baltimore, Md., assignors to the United States of America as represented by the Secretary of the Navy

Filed July 24, 1964, Ser. No. 385,559
3 Claims. (Cl. 330—109)

The instant invention relates generally to active twin T notch filters and more specifically to an improved variable feedback notch filter.

Recent developments in the guided missile art have been hampered by many difficulties quite sophisticated in nature. Not the least of these has been body mode resonance resulting from mechanical flexure. To eliminate contamination of desired signals by this body mode resonance it is necessary to provide body mode filtering in missile autopilot rate channels.

Due to the nature of prior filter networks it has been extremely difficult for designers to obtain the required transfer functions and still meet other design criteria. What was needed was a filter network providing additional degrees of freedom in the selection of design parameters.

It should be noted that body mode resonance is not solely the problem of missile designers. It adversely affects virtually all areas where servo-mechanisms are used.

It is an object of this invention to provide an active notch filter network for removing undesired body mode resonance.

Another object of the present invention is to provide an active twin T notch filter for removing undesired body mode resonance.

Still another object of this invention is to provide an active twin T notch filter for removing undesired body mode resonance without shifting the phase of relatively low frequency control signals.

A further object of the instant invention is to provide an active twin T notch filter having variable output functions.

And a still further object of the present invention is to provide a variable feedback active twin T notch filter for removing undesired body mode resonance without shifting the phase of low frequency control signals, and affording designers greater degrees of freedom in the choice of design parameters than heretofore available.

The attendant advantages of this invention will be better appreciated and said invention will become clearly understood by reference to the following detailed description and accompanying drawings illustrating one embodiment of the instant invention, wherein.

Figure 1:
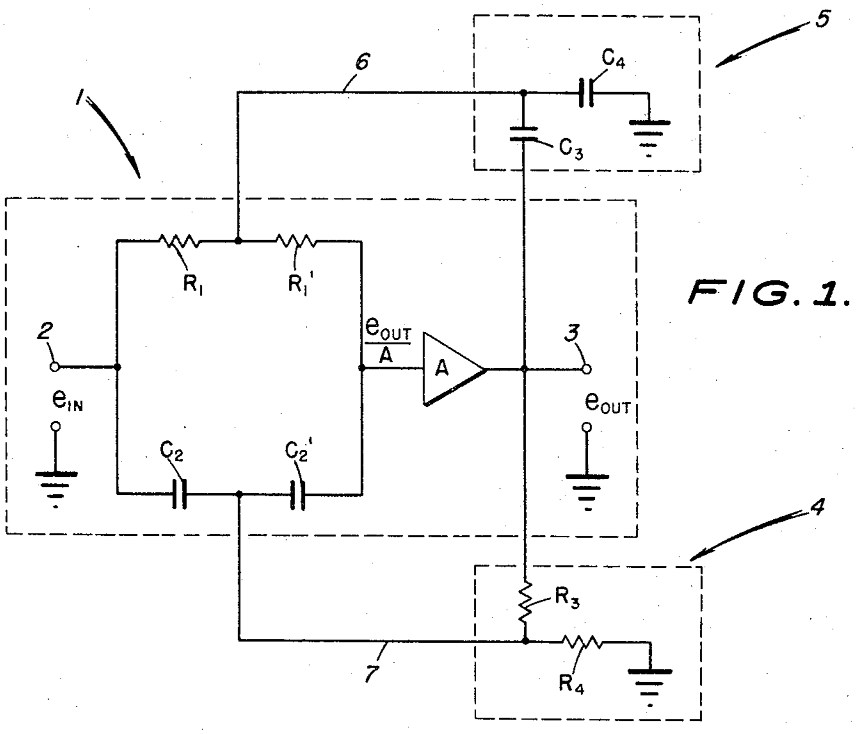
FIG. 1 is a schematic diagram of the instant invention.

Referring to the drawings in more detail, and more specifically to FIG. 1, an active twin T notch filter network, of a well-known type, and comprising a resistive portion including the resistors $R_1$ and $R_1'$, a reactive portion including the capacitors $C_2$ and $C_2'$, and a transistorized amplifier A, is shown at 1. An input signal is applied to said filter network 1 across the input terminal 2 and ground, and an output signal is applied across the output terminal 3 and ground. A pair of feedback networks are shown at 4 and 5 comprising resistors $R_3$ and $R_4$ and capacitors $C_3$ and $C_4$, respectively.

Capacitors $C_3$ and $C_4$ are connected in series with the output terminal 3 and ground, and the resistors $R_3$ and $R_4$ are likewise connected in series with the output terminal 3 and ground, the two feedback networks 4 and 5 being connected in electrical parallelism with each other.

A pair of feedback loops 6 and 7 are shown connected, respectively, between the junction of the capacitors $C_3$ and $C_4$ and the junction of the resistors $R_1$ and $R_1'$, and between the junction of the resistors $R_3$ and $R_4$ and the junction between the capacitors $C_2$ and $C_2'$.

It is obvious that the entire output signal of the filter network 1 appears across both the combination of the resistors $R_3$ and $R_4$, and the combination of the capacitors $C_3$ and $C_4$. It is equally obvious that the portion of the output signal of the filter network 1 that is fed back to said network 1 through the feedback loop 6 is that signal appearing across the capacitor $C_4$. Likewise, the portion of the output signal of the filter network 1 fed back to said network 1 through the feedback loop 7 is that signal appearing across the resistor $R_4$. The proportion of the output signal of the filter network 1 fed back through the feedback loop 6 will be henceforth referred to as $\beta_1$, and that fed back through feedback loop 7 as $\beta_2$.

It is to be emphasized at this point that both $\beta_1$ and $\beta_2$ are variable. It will be shown later on that $\beta_1$ is a function of the capacitors $C_3$ and $C_4$, and $\beta_2$ is a function of the resistors $R_3$ and $R_4$.

Figure 2:
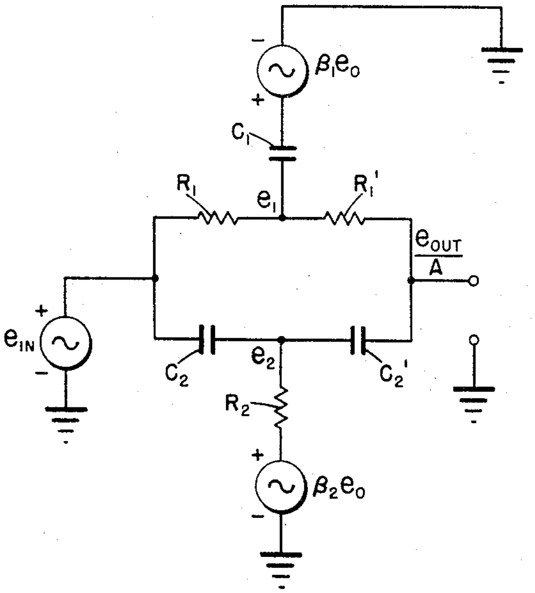
FIG. 2 is an "equivalent" circuit diagram of the network illustrated in FIG. 1.

The theoretical voltage transfer function, $e$ out/$e_{in}$, for the variable feedback notch filter shown in FIG. 1, will now be derived based on the following assumptions:

(1) Zero source impedance
(2) Zero amplifier output impedance
(3) Infinite amplifier input impedance By use of Thevenin's theorem, the variable feedback notch filter circuit of FIG. 1 can be transformed into the hypothetical equivalent circuit shown in FIG. 2 in a well-known manner.

The following notation will be used:

$C_1$=parallel equivalent of $C_3$ and $C_4$
$C_1 = C_3$ and $C_4$
$R_2$=parallel equivalent of $R_3$ and $R_4$ $$R_2=\frac{R_3R_4}{R_3+R_4}$$

Although at first glance $\beta_1$ appears equal to $$\frac{C_4}{C_3+C_4}$$

the result of $$\beta_1=\frac{C_3}{C_3+C_4}$$

is brought about by the fact that the impedance of a capacitor is inversely proportional to its capacitance.

$$\beta_1=\frac{C_3}{C_3+C_4}$$

$$\beta_2=\frac{R_4}{R_3+R_4}$$

Application of Kirchoff's current law to the circuit of FIG. 2 yields the following voltage transfer function:

$$e_o/e_{in}=A\frac{P_1(s)}{P_2(s)}$$

where:

$$P_1(s)=R_1R_1'R_2C_1C_2C_2's^3+R_2(R_1+R_1'+R_1')C_2C_2's^2+R_2(C_2+C_2')s+1$$

and $$P_2(s)=R_1R_1'R_2C_1C_2C_2's^2+[R_1R_2C_1(C_2+C_2')(1-A\beta_1)+R_1R_1'C_1C_2'(1-A\beta_2)+R_2(R_1+R_1')C_2C_2']s^2+[R_1C_1(1-A\beta_1)+C_2'(R_1+R_1')(1-A\beta_2)+R_2(C_2+C_2')]s+1$$

Now if $R_1=R_1'$, $C_2=C_2'$ and $R_1C_1=4R_2C_2$, then the voltage transfer function becomes:

$$e_{o/e_{in}}=A\frac{\tau_o^2s^2+1}{\tau_o^2s^2+2\xi\tau_os+1}$$

where the following definitions are used:

$$\tau_o=\sqrt{2R_1R_2C_2}$$

$$\xi=(1-A\beta_1)\frac{C_1}{2C_2}+(1-A\beta_2)\sqrt{\frac{2C_2}{C_1}}$$

The versatility of the instant invention is best illustrated in FIGS. 3 through 6. These figures are illustrative of some of the various twin T notch filter configurations useful for missile hardware, and which are merely special cases of the invention described hereinabove.

Figure 3:
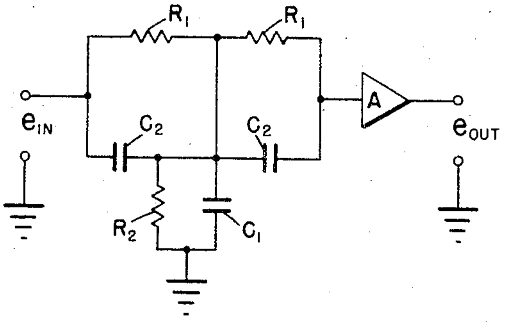
FIG. 3 is a schematic diagram of a modified form of the network illustrated in FIG. 1.
Figure 4:
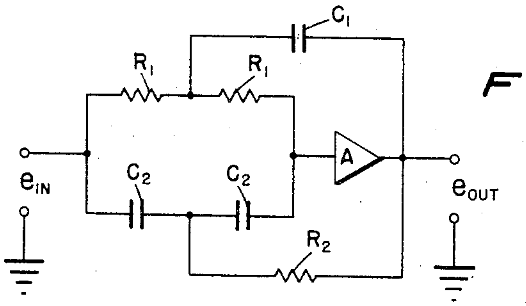
FIG. 4 is a schematic diagram of another modification of the network illustrated in FIG. 1.
Figure 5:
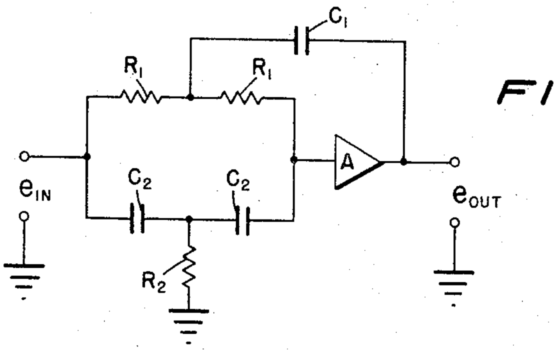
FIG. 5 is a schematic diagram of still another modification of the network illustrated in FIG. 1.
Figure 6:
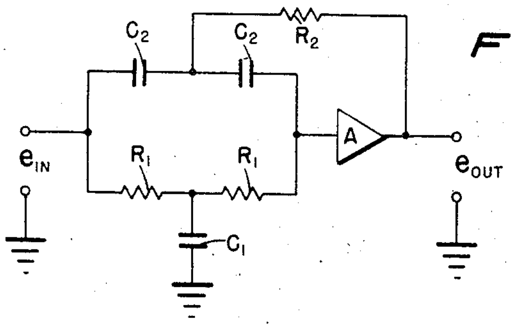
FIG. 6 is a schematic diagram of a further modification of the network illustrated in FIG. 1.

With $\beta_1=0$ and $\beta_2=0$ the network of FIG. 1 reduces to that shown in FIG. 3. With $\beta_1=1$ and $\beta_2=1$ the network of FIG. 1 reduces to that shown in FIG. 4. Now when $\beta_1=1$ and $\beta_2=0$ the network of FIG. 1 reduces to that illustrated in FIG. 5, and when $\beta_1=0$ and $\beta_2=1$ the network illustrated in FIG. 6 is obtained.

It is to be noted that while the networks illustrated in FIGS. 3 through 6 are, for the most part, well known, they are included to show the additional versatility of the instant invention, and in no way undermine its inherent novelty as disclosed hereinabove.

It can readily be seen that a large number of variations and modifications of the present invention are possible in the light of the aforementioned teachings. It is therefore to be understood that within the scope of the appended claims the instant invention may be practiced in a manner otherwise than is specifically described herein.

What is claimed is:

1. The combination, in a variable feedback notch filter, comprising a first resistor, a second resistor connected in series with said first resistor, a first capacitor, a second capacitor connected in series with said first capacitor, said first and second capacitors being connected in electrical parallelism with said first and second resistors, a ground line, a unity gain amplifier connected to said second resistor and said second capacitor, and feedback means including a pair of series connected feedback capacitors connected between the output of said amplifier and said ground line in electrical parallelism with a pair of series connected feedback resistors and the output of said amplifier for feeding back a predetermined portion $\beta_1$ of the output signal from said amplifier to the junction of said first and second resistors and a predetermined portion $\beta_2$ of said amplifier output signal to the junction of said first and second capacitors.

2. The invention as set forth in claim 1, wherein the junction of said series connected feedback capacitors is connected to the junction of said first and second resistors, and the junction of said series connected feedback resistors is connected to the junction of said first and second capacitors.

3. The invention as recited in claim 2 wherein said predetermined amplifier output signal portions $\beta_1$ and $\beta_2$ are each variable between the values of one and zero, and $$\beta_1=\frac{C_3}{C_3+C_4} \text{ and } \beta_2=\frac{R_4}{R_3+R_4}$$

where $C_3$ is one of said series connected feedback capacitors connected to the output of said amplifier, $C_4$ is the other of said series connected feedback capacitors connected between feedback capacitor $C_3$ and said ground line, $R_3$ is one of said series connected feedback resistors connected to the output of said amplifier, and $R_4$ is the other of said series connected feedback resistors connected between feedback resistor $R_3$ and said ground line.

References Cited

UNITED STATES PATENTS

| | | | |
|---|---|---|---|
| 2,441,567 | 5/1948 | Darlington | 330—109 X |
| 2,987,678 | 6/1961 | Miller et al. | 330—109 |

ROY LAKE, *Primary Examiner.*

NATHAN KAUFMAN, *Examiner.*